EDWARD A. FRANKLIN.

Button Hole Scissors.

No. 124,046.  Patented Feb. 27, 1872.

UNITED STATES PATENT OFFICE.

EDWARD A. FRANKLIN, OF BRENHAM, TEXAS.

IMPROVEMENT IN BUTTON-HOLE SCISSORS.

Specification forming part of Letters Patent No. 124,046, dated February 27, 1872.

Specification describing a certain Improved Button-Hole Scissors, invented by EDWARD A. FRANKLIN, of Brenham, in the county of Washington and State of Texas.

Figure 1:
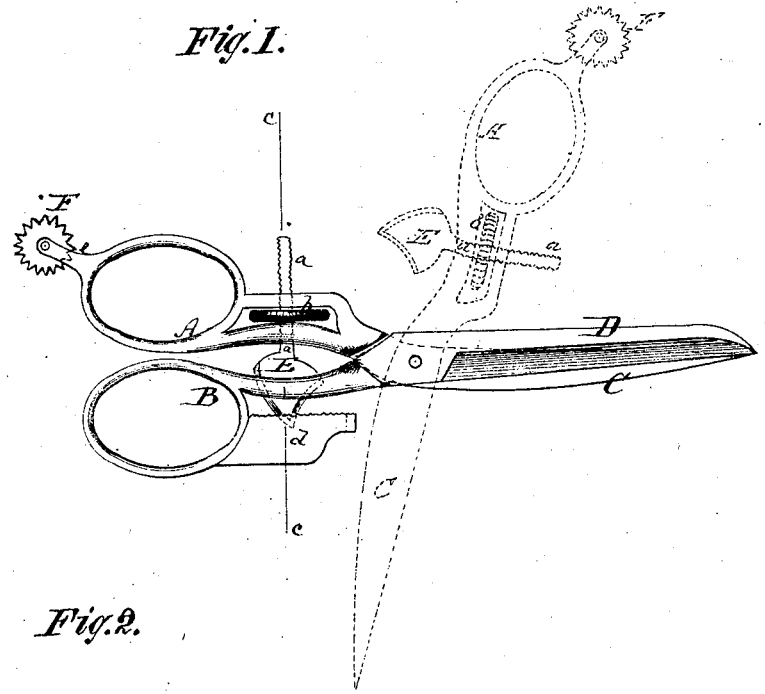
Figure 2:
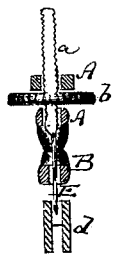

Figure 1 represents a face view of my improved scissors. Fig. 2 is a transverse section of the same on the line $c\ c$, Fig. 1.

Similar letters of reference indicate corresponding parts.

This invention relates to a new arrangement of a button-hole attachment to scissors or shears, whereby the cutter may be vertically adjusted for cutting holes of suitable length, and the screw-shank of the same prevented from turning in its socket. The invention likewise includes a new arrangement of a guard-plate and a tracing-wheel, as hereinafter described.

A B in the drawing are the scissors-handles; C D, the blades. E is the button-hole cutter, made of flat metal, with a V-shaped cutting-edge. The screw-shank $a$ of the cutter passes through a slotted portion of the handle A, and through a milled nut, $b$, which is placed within the slot of said handle. The screw $a$ is essentially square in cross-section, but a screw-thread is turned on its corners or edges, so that, while it cannot turn in its socket in the handle A, it may yet be adjusted vertically to cut holes of varying size. The other handle, B, is provided with a projecting guard, $d$.

The cloth to be cut is placed upon said guard between the same and the handle B. The handles A B are then brought together, which will cause the cutter E to pierce the cloth, and with its point enter a cavity in the guard to the desired depth.

By means of the nut $b$, the cutter E can be set to bring a greater or less portion of its converging cutting-edges through the fabric, and thereby produce a button-hole of suitable size. The handle B is, of course, perforated or recessed to let the blade E reach the guard. By throwing the scissors wide open, the blade E can also be used for ripping. F is a toothed tracing-roller, hung in an ear, $e$, which projects from one of the scissors-handles. It will be very convenient on ladies' scissors for delineating patterns to be cut.

I do not claim a V-shaped button-hole cutter, nor adjusting the same by means of a screw; but

Having thus described my invention, I claim as new and desire to secure by Letters Patent—

1. The V-shaped button-hole cutter E, square screw-shank $a$, and nut $b$, arranged with the slotted handle of the scissors, as and for the purpose shown and described.

2. The guard $d$ on the handle B, in combination with the adjustable V-shaped cutter E, screw-shank $a$, and nut $b$ on the other handle A, substantially as and for the purpose herein shown and described.

3. The tracing-roller F, applied to and combined with a pair of scissors, as specified.

EDWARD A. FRANKLIN.

Witnesses:
A. MEYER,
B. R. FRANKLIN.